United States Patent
Hayashi et al.

(10) Patent No.: US 9,256,223 B2
(45) Date of Patent: Feb. 9, 2016

(54) SAFETY INTERLOCK DEVICE FOR A PLANT

(75) Inventors: Toshifumi Hayashi, Yokohama (JP); Atsushi Kojima, Nishitokyo (JP); Hirotaka Sakai, Machida (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 630 days.

(21) Appl. No.: 13/582,202

(22) PCT Filed: Mar. 4, 2011

(86) PCT No.: PCT/JP2011/055052
§ 371 (c)(1),
(2), (4) Date: Aug. 31, 2012

(87) PCT Pub. No.: WO2011/111620
PCT Pub. Date: Sep. 15, 2011

(65) Prior Publication Data
US 2012/0323341 A1    Dec. 20, 2012

(30) Foreign Application Priority Data

Mar. 10, 2010   (JP) .................. 2010-053742

(51) Int. Cl.
G05B 19/18 (2006.01)
G05B 23/02 (2006.01)
G21D 3/00 (2006.01)

(52) U.S. Cl.
CPC ............ *G05B 23/0235* (2013.01); *G21D 3/001* (2013.01); *G05B 2219/24042* (2013.01); *Y02E 30/40* (2013.01)

(58) Field of Classification Search
CPC .............................................. G05B 2219/24042
USPC ....................................... 700/1, 6, 7
See application file for complete search history.

(56) References Cited

U.S. PATENT DOCUMENTS

| 4,843,537 A | 6/1989 | Arita et al. |
| 2002/0099455 A1 * | 7/2002 | Ward ............................. 700/83 |
| 2009/0260082 A1 * | 10/2009 | Rissa et al. ...................... 726/22 |

FOREIGN PATENT DOCUMENTS

| JP | 63 140305 | 6/1988 |
| JP | 2-54121 A | 2/1990 |
| JP | 6-202702 A | 7/1994 |
| JP | 9-138703 A | 5/1997 |
| JP | 11 94987 | 4/1999 |

(Continued)

OTHER PUBLICATIONS

International Search Report Issued Apr. 5, 2011 in PCT/JP11/055052 Filed Mar. 4, 2011.

(Continued)

*Primary Examiner* — Mohammad Ali
*Assistant Examiner* — Emilio J Saavedra
(74) *Attorney, Agent, or Firm* — Oblon, McClelland, Maier & Neustadt, L.L.P.

(57) ABSTRACT

A control device includes: an input portion for inputting a process signal transmitted from a plant; a numerical processing part for outputting a Boolean value evaluating normal/abnormal of the process signal by a numerical processing based on a program; and a logical processing part for a logical processing of the Boolean value based on a logic circuit and then outputting a control signal related a safety protection operation of the plant.

6 Claims, 10 Drawing Sheets

(56) References Cited

FOREIGN PATENT DOCUMENTS

| | | |
|---|---|---|
| JP | 2002 14703 | 1/2002 |
| JP | 2002 198825 | 7/2002 |
| JP | 2002-293218 A | 10/2002 |
| JP | 2004-118265 A | 4/2004 |
| JP | 2005-208770 A | 8/2005 |
| JP | 2007-283448 A | 11/2007 |
| JP | 2008 171154 | 7/2008 |
| JP | 2009 282751 | 12/2009 |

OTHER PUBLICATIONS

Office Action issued Oct. 9, 2012, in Japanese Patent Application No. 2010-053742.

International Preliminary Report on Patentability and Written Opinion issued Oct. 2, 2012 in PCT/JP2011/055052 filed Mar. 4, 2011.

Japanese Office Action Issued May 28, 2013 in Patent Application No. 2010-053742.

* cited by examiner

SAFETY INTERLOCK DEVICE FOR A PLANT

TECHNICAL FIELD

The present invention relates to a control device used in various plants, such as a nuclear plant, a chemical plant and the like.

BACKGROUND ART

Some control devices such as a safety interlock or the like are installed in a nuclear plant. The safety interlock carries out emergency shut down of the nuclear reactor at the time of abnormalities, or starts automatically engineered safety systems such as an emergency core cooling system or the like.

For example, the emergency core cooling system in a boiling water reactor of the electric power plant can be started automatically, or can also be started by the manual operation of a plant operator, if the water level of a nuclear reactor falls abnormally or the pressure of a containment vessel rises abnormally.

Boolean value such as TRUE or FALSE are made to correspond to arbitrary process signals to perform logical judgment for the pump starting of the emergency core cooling system.

Conventionally such logic realized by hardware such as comparator, relay and timer. Recently such logic realized by programmable controller (PLC; Programmable Logic Device) using CPU with development of computer technology.

It is known Operating System (OS) designed for such PLC used for the safety interlock of a nuclear power generation plant, having a function of input/output of a process signal, periodic execution of program, execution mode of communicative management, and a self-diagnosis of under initialization and execution (for example, non-patent literature 1).

On the other hand, some trial also conducted to realize such logic by semiconductor device such as FPGA (Field Programmable Gate Array) (for example, patent documents 1-4).

According to the FPGA, vendor of the safety interlock can be constructed logic in their discretion, without depending on the vendor of a semiconductor. Further, logic change is comparatively easy if the FPGA is used SRAM type or flash type.

FPGA can perform operation of the Boolean value on the hardware gate directly. That FPGA is unnecessary loading of an operation command and decoding like in PLC, and also unnecessary an OS. Further, the directly wiring among the FPGA realizes high efficiency in accessing the Boolean value as an operating object, compare with PLC loading the Boolean value from RAM or storing them to RAM.

Thus the FPGA performs processing by the assigned dedicated circuit, and then processing of the Boolean value can be efficiently performed rather than CPU.

CITATION LIST

Patent documents

[Patent documents 1] JP2005-249609A
[Patent documents 2] JP2006-236214A
[Patent documents 3] JP2009-522644A
[Patent documents 4] JP2003-177806A

Non-Patent Document

[Non-patent literature 1] EPRI, TR-107330, "Generic Requirements Specification for Qualifying a Commercially Available PLC for Safety-Related Applications in Nuclear Power Plants"

SUMMARY OF THE INVENTION

Technical Problem

As mentioned above, FPGA can operate logical processing such as the Boolean value efficiently rather than CPU. But FPGA cannot operate numerical processing efficiently enough.

Indeed FPGA is theoretically possible to execute the numerical operation for numerical comparison. But in this case tens times or more gate is needed compared with the case of logical operation. For this reason, if it is going to perform all the numerical operations in the safety interlock by FPGA, a hardware scale becomes large with assignment of a dedicated circuit, and it is not economical.

FPGA have several kind of mounting method on semiconductor such as SRAM type, flash type, and anti-fuse type. Anyone of these mounting methods of FPGA, working speed of the circuit itself is very lower comparing with the speed of CPU. The above mentioned content derives from the ability of FPGA to compose logical construction after manufacturing semiconductor.

Although OS of PLC is simplified in comparison with general-purpose OS, it has a certain amount of complexity by mounting the self-diagnostic function, the communication function, and the maintenance function. For this reason, burden of the activity become increase for guaranteeing quality of OS of PLC such as accumulation of sufficient operation track record, and the verification and a validity check (V&V).

For example, if OS of PLC operates the program code of a diagnostic function accidentally during the operation in execution mode, it may change a program or a constant and will cause malfunction.

In general-purpose OS, in order to prevent referring incorrect memory, mounted memory protection function performs error handling by interruption when the memory is referred incorrectly. However, mounting such a memory protection function makes OS complicate, and brings risk of new malfunction, and increases the burden of V&V.

The present invention has been made in view of the circumstances, and an object of the present invention is to provide the control device having simple configuration, excellent in the whole processing efficiency, and excellent in stability of operation.

Solution to Problems

The embodiment of present invention provides a control device includes: an input portion for inputting a process signal transmitted from a plant; a numerical processing part for outputting a Boolean value evaluating normal/abnormal of the process signal by an numerical processing based on a program; and a logical processing part for a logical processing of the Boolean value based on a logic circuit and then outputting a control signal of the plant for a safety protection operation.

Advantageous Effects of Invention

According to the control device concerning the embodiment of present invention, a control device having simple configuration, excellent in the whole processing efficiency, and excellent in stability of operation is provided.

BRIEF DESCRIPTION OF THE FIGS.

DESCRIPTION OF EMBODIMENTS (The First Embodiment)

Hereafter, the embodiment of the present invention is described with reference to the attached drawings.

Figure 1:
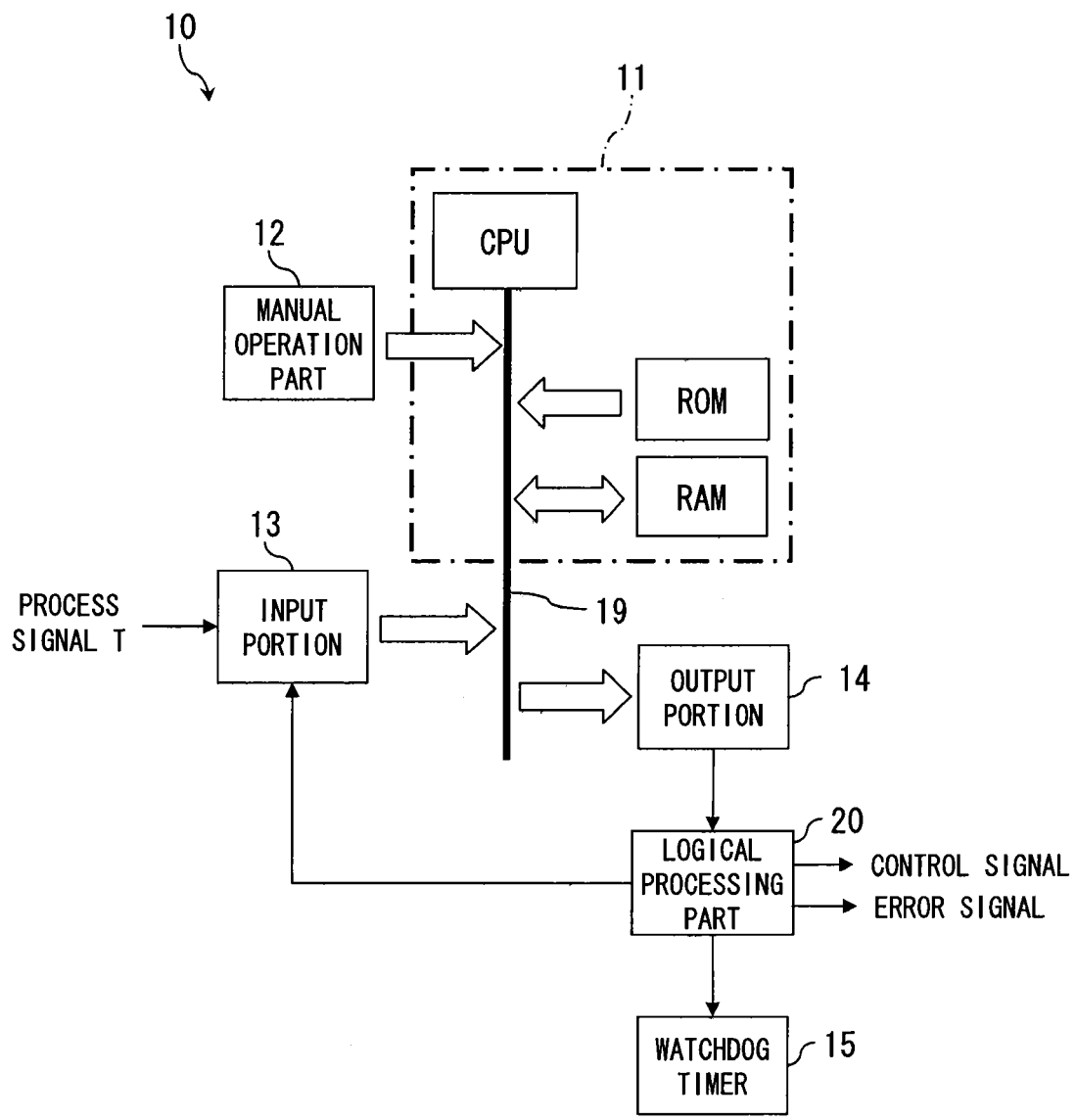
FIG. 1 is a block diagram showing a control device in accordance with a first embodiment of the present invention.

As shown in FIG. 1 first embodiment of the control device 10 (henceforth "safety interlock 10") relating safe protection of the plant includes: a numerical processing part 11 provided with the function of CPU, ROM and RAM; a manual operation part 12 for a plant operator to handle; an input portion 13 inputs the process signal T transmitted from a plant and then memorize temporarily; an output portion 14 memorizes the operation result of the CPU temporarily and then output to a logical processing part 20; and a watch dog timer 15.

Among the components of the safety interlock 10 such as ROM, RAM, the manual operation part 12, the input portion 13 and the output portion 14 are arranged on the address space of CPU via bus 19. Therefore, CPU can uniquely access the data on RAM, the input portion 13, and the output portion 14 by specifying the address on an address space.

The input portion 13 inputs the process signal T transmitted from various sensors installed in the plant and then holds it temporarily. If the process signal T is originally an analog signal, the process signal T is inputted into input portion 13 after being digitized by the A/D converter (not shown). The process signal T includes the numerical signal expressing physical quantity such as temperature, pressure, flow, flow velocity, voltage, current, the degree of valve-opening, and dose of radiation, etc. and Boolean value expressing ON/OFF of a pump, opening/closing of a valve, ON/OFF of a pressure switch, ON/OFF of a manual operation signal, etc. concretely. The control signal from other process control equipments is also included.

The output portion 14 holds temporarily the Boolean value which is the operation result of the numerical processing part 11 mentioned later, and transmits it to the logical processing part 20.

The input portion 13 and the output portion 14 having a buffer function, by using a dual port memory for example, inputting the process signal T from the exterior without applying excessive load to CPU, and the operation result data from CPU is transmitted to the logical processing part 20.

The input portion 13 has a bit showing whether the logical processing part 20 is a processing state or a non-processing state, and CPU scans this bit to check the logical processing part 20 is a non-processing state (FALSE), and then starts the numerical processing in the part 11.

The output portion 14 has a bit showing whether the numerical processing part 11 is a processing state or a non-processing state, if in the non-processing state, CPU changes the setting of this bit into FALSE from TRUE to transmit the temporarily held Boolean value for the logical processing part 20 and then start logical processing.

The numerical processing part 11 outputs the Boolean value evaluating normal/abnormal of the process signal T by the numerical processing based on a program. Then the Boolean value is transmitted to the logical processing part 20 after temporarily memorized in the output portion 14 via the bus 19.

The numerical processing part 11 starts the numerical processing of the next inputted various process signals T after the logical processing of the Boolean value was completed in logical processing part 20. The numerical processing part 11 performs the numerical processing of the various process signals T sequentially, and then finally outputs an operation complete signal.

ROM (Read Only Memory) is a nonvolatile memory storing the program and the constant to perform a numerical operation. Then the program and the constant stored in ROM will read into RAM when the safety interlock 10 boot-up.

The constant includes the threshold value for judging whether which Boolean value of TRUE or FALSE is made to apply for the inputted process signal T. The program contrasts the inputted process signal T and its corresponding threshold value, and then output either a TRUE signal (1) or a FALSE signal (0).

RAM (Random Access Memory) is a volatile memory reading and writing data freely to make CPU perform numerical processing according to the resident program and constant read from ROM, and then memorizes the operation result in CPU temporarily.

CPU performs next numerical processing to the process signal T memorized temporarily in the input portion 13 according to the RAM-resident program and then makes the operation result hold in the output portion 14. CPU performs these series processing with the cycle of several 10 milliseconds in consideration of the response time required in the safety protection operation.

Next, the numerical processing in CPU is explained concretely. CPU starts the processing with defined cycle according to an internal clock. Here, nuclear reactor water level signal T1 is taken up as process signal T, and applying the threshold value L for normal/abnormal judgment of the water level. Then suppose that each data is assigned to the following address.

| | |
|---|---|
| water level signal T | address 500 to 501st |
| threshold value L | address 3000 to 3001st |
| decision result | 5th-bit at number 2001st |

The numerical processing for deriving the decision result is performed by the next program. Here, R0 and R1 are the registers of CPU and X register is a register for bit processing in CPU.

| | |
|---|---|
| A1: LD R0, 500; | 500-501st data is loaded to R0. |
| A2: LD R1, 3000; | 3000-3001st data is loaded to R1. |
| A3: SUB R0, R1; | R0-R1 (nuclear reactor water level - L) |
| A4: BGE A7; | If results are positive and the water level ≥ L, branch to A7. |
| A5: LDX #1; | '1' is put into X register. |
| A6: BRA A8; | branch to A8. |
| A7: LDX #0; | '0' is put into X register. |
| A8: STX 2001:5; | value in X register is stored in the 5th-bit at 2001st. |

This program has a simple structure with start processing from command (A1) and end processing to command (A8) certainly without repetition on the way, though the branching is included in the command (A4, A6) setting up an output address from the decision result of the size relation.

When performing comparison numerical processing to the plurality of input signal such 500 process signals T, placing the 500 above-mentioned program with exchanging the address of the input signal (operand of A1), the address of the threshold value (operand of A2), the size relation between the input signal and the threshold value (operator of A4), and the address of the output place of an operation result (operand of A8) and then processes sequentially.

For this reason, in order to operate the plurality of process signals T, the program of the length is arranged proportional to the number of these process signals T, nevertheless complexity does not increase and prediction of processing time is also attained.

When the numerical processing part 11 completes a numerical processing, CPU makes the processing result memorize in the output portion 14 temporarily. Then the CPU sets the bit on the output portion 14 FALSE (non-processing state), the bit shows whether the CPU is a processing state or a non-processing state. This sequence is realized to mount a writing program for the output portion 14, on the tail end of the above-mentioned plural arranged programs.

CPU also has the diagnostic function like PLC explained in the "Background Art" in addition to the above-mentioned program. As mentioned above the numerical processing has simple sequential processing that it is easily verifiable existence of an access error of the memory under execution by the diagnostic function.

It is easy to design exclusive-purpose CPU applied with the safety interlock 10 in this embodiment, because a little function is demanded compared with general-purpose CPU.

The watch dog timer 15 is constituted independently from the numerical processing part 11 and the logical processing part 20. The watch dog timer 15 reports the timeout information a period to end from a start of the logical processing part 20 or a period to end of the logical processing part 20 from a start of the numerical processing part 11 exceeds a setting time.

Accordingly the operation state of CPU and the logical processing part 20 can be diagnosed with high reliability, and contributing an improvement of the plant safety.

The watch dog timer 15 is realized by one shot multivibrator, for example.

The watch dog timer 15 is initialized synchronizing with the start or finish of the numerical processing part 11 or the logical processing part 20. Then the watch dog timer 15 is set up to time out somewhat long period rather than the processing cycle of logical processing part 20 or combining the processing cycle of the logical processing part 20 and the numerical processing part 11. For example, it will be set up to time out in 30 ms, if a processing cycle is 25 ms.

Thereby the watch dog timer 15 is time-out to notify the abnormalities of the safety interlock 10 when the periodic processing of the numerical processing part 11 or the logical processing part 20 is stopping or delaying abnormally.

The numerical processing part 11 and the logical processing part 20 starts their own processing by checking other's processing state mutually that one side stops will also stop another side. Therefore, even if processing of either one of CPU and the logical processing part 20 stops, abnormalities are notified by the watch dog timer 15.

Figure 2A:
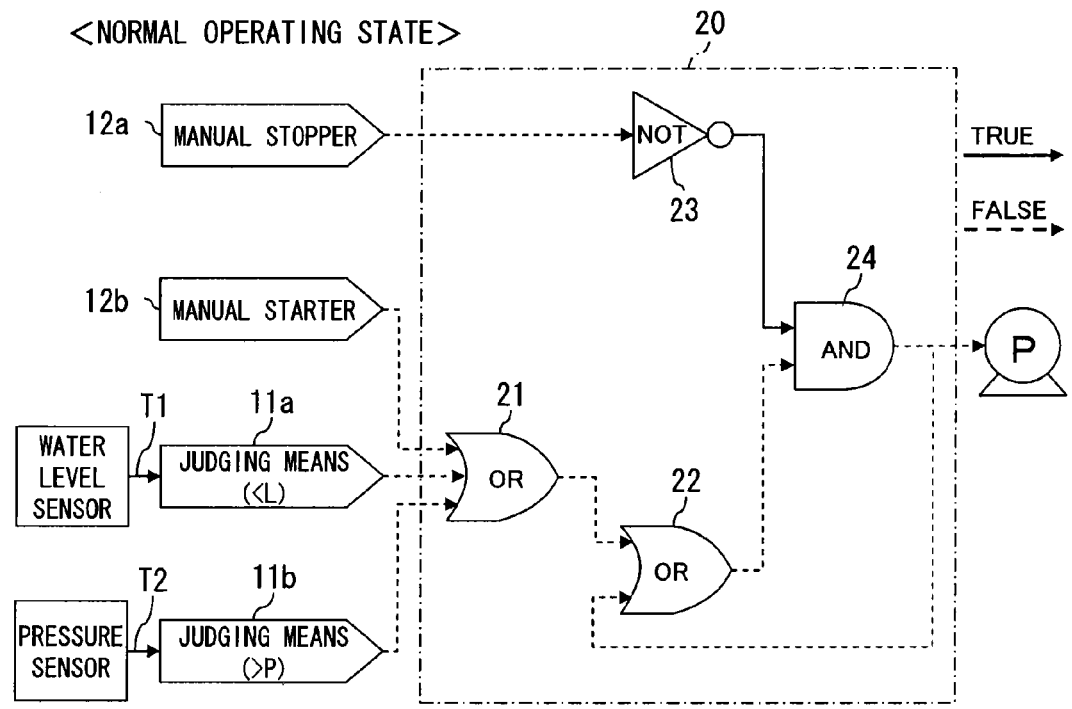
FIG. 2A is an explanatory view of the composition and operation for a logical processing part applied to each embodiment.

As shown in FIG. 2A, the logical processing part 20 contains some logic element such as 1st-OR gate 21, 2nd-OR gate 22, NOT gate 23, and AND gate 24.

The logical processing part 20 is realized by FPGA (Field Programmable Gate Array) to perform operation of the Boolean value and time delay of the Boolean value. The logic element of the FPGA is wired by programming.

The logical processing part 20 inputs the Boolean value currently held at the output portion 14 (FIG. 1), processes it based on the logic circuit and then outputs the control signal related the safety protection operation of the plant. Here the logical processing part 20 is illustrated the logic for outputting the control signal which starts the pump P of the reactor core emergency cooling system (not shown).

The manual starter 12b starts the safety protection operation by the manual operation of a plant operator, even if a case the process signal T from the plant shows normalcy.

The manual stopper 12a stops the started safety protection operation by the manual operation of the plant operator.

The function of the manual starter 12b and the manual stopper 12a are included in the manual operation part 12 (FIG. 1), FALSE is normally outputted, and the output changes to TRUE by the manual operation of the plant operator. However, the manual starter 12b and the manual stopper 12a have a switch structure which is not simultaneously set to TRUE.

The judging means 11a and 11b are shown as functional elements in the numerical processing part 11, expressing each program (above-mentioned A1-A8 command) which judges normal/abnormal of each process signal T.

The judging means 11a performs judgment of the process signal T1 from the water level sensor which detects the nuclear reactor water level. If the nuclear reactor water level detected by the water level sensor is lower than preset value L, abnormal judgment will be done to output TRUE, and incase another detecting result, normal judgment will be done to output FALSE.

The judging means 11b performs the judgment of the process signal T2 from the pressure sensor which detects the pressure of a containment vessel. If the pressure detected by the pressure sensor is higher than preset value P, abnormal judgment will be done to output TRUE, and incase another detecting result, normal judgment will be done to output FALSE. It assumes detecting the internal pressure of the containment vessel when leakage of the reactor pressure vessel occurs to raise the internal pressure of the containment vessel.

As mentioned above, if the output portion 14a sets a bit FALSE showing the part 11 completed the numerical processing, transmits the currently held Boolean value to the logical processing part 20 for performing the logical operation. Simultaneously the input portion 13 sets the bit TRUE showing the logical processing part 20 is currently performing.

Here, it is usual to make TRUE and FALSE of the Boolean value correspond to the high potential and low potential of electric signal, respectively. However, this correspondence may be made reverse from a viewpoint of fail-safe.

Several or tens of valves are provided in addition to the pump P shown in FIG. 2A in the reactor core emergency cooling system (not shown) which works when the safety interlock 10 (FIG. 1) perceived abnormalities. The logic shown in FIG. 2A is a part of the logic scale of the whole safety interlock 10. Since the reactor core emergency cooling system is multiplexed so that the real logic scale is several hundred times of the logic shown in FIG. 2A.

When using flash type FPGA, in order to change the logic design of FPGA, the high voltage is needed rather than the usual operating voltage. In order to the logic design changeable, the logical processing part 20 considered as the removable, after removing the part 20 the logic design is changed using a exclusive tool. By considering such a structure, the risk of exchanging the logic design of FPGA by malfunction can be eliminated.

Otherwise instead of considering above removable design, a logic change function is provided in the safety interlock 10 and then the logical processing part 20 make the logic change by high voltage supply from the outside. While, the logical processing part 20 can also be realized using the anti-fuse type which cannot change logic, SRAM type FPGA and ASIC.

A delay circuit (not shown) is provided after the judging means 11a and 11b. The delay circuit acts, for example, input TRUE into a logic gate (here 1st-OR gate 21) when the TRUE continues for a definite period of time (e.g. 30 seconds), even if the Boolean value changes from FALSE to TRUE by the water level sensor T1 shows the water level falls below L.

This delay circuit is easily realizable by mounting a counter circuit with a reset function and counting up a clock after the input signal is set to TRUE. But it is little use in frequency of the time delay of the Boolean value, though a circuit becomes complicated and many logic elements are used.

The logical processing time of the Boolean value is decided by the logic gate delay time and the wiring delay time in FPGA. In the case of flash type FPGA, the OR gate delay time for two signals calculation is 1 or less nanosecond, and the wiring delay time is smaller than that.

The logical processing part 20 configured with FPGA having synchronous design, and can process the logic gates circuit shown in FIG. 2A combined about 100 steps with one clock under the operation condition of about 10 MHz clocks.

However, the clock frequency of FPGA is considered that the malfunction with the signal delay does not cause, that it is not necessarily to perform all of binary operation and delay processing of the Boolean value with one clock.

After ending all binary operation and delay processing of the Boolean value, the logical processing part 20 outputs the control signal to the reactor core emergency cooling system (not shown), and then the input portion 13 set the bit (FALSE) showing the logical processing part 20 completes the job.

The 1st-OR gate 21 inputs the Boolean value originated in the various process signals T1 T2 and the Boolean value originated in a manual starter 12b of the safety protection operation. Besides 1st-OR gate 21 outputs FALSE if all the inputted Boolean values are FALSE, while outputs TRUE if at least one of the inputted Boolean values is TRUE.

Figure 4:
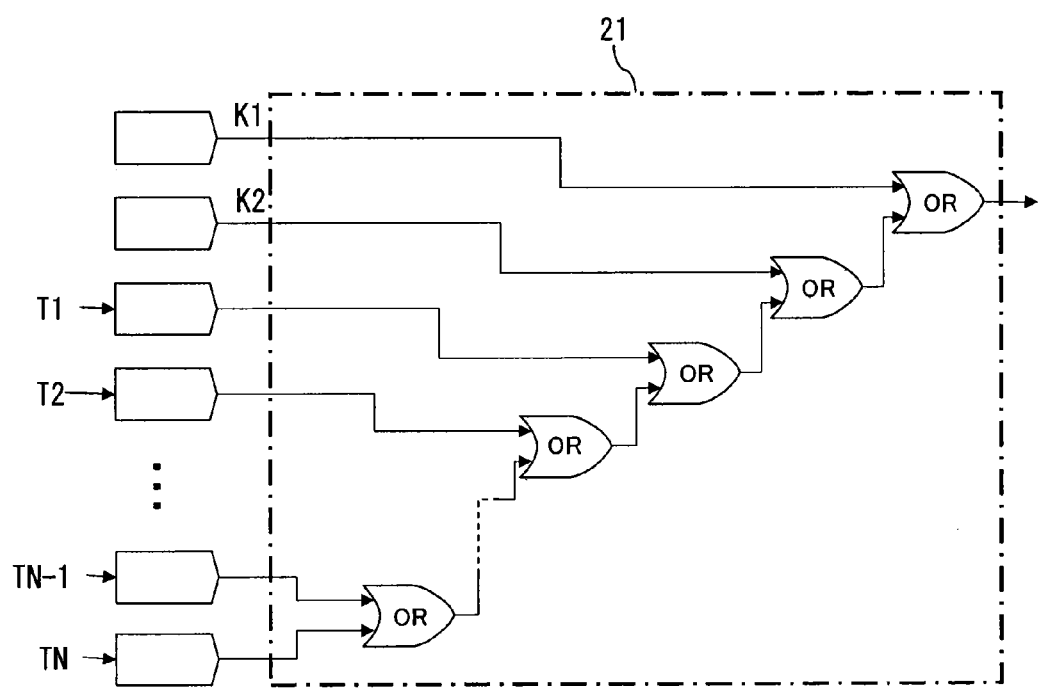
FIG. 4 is a block diagram of a 1st-OR circuit.

Although FIG. 2A is illustrated three Boolean values are inputted in 1st-OR gate 21 as an example. As shown in FIG. 4, in practice, 1st-OR gate 21 can also inputs and processes the Boolean value K1 K2 originated in the control information of other devices (not shown) and another Boolean value T1 T2 - - - $T_N$ originated in the tens to hundreds of process signals.

As shown in FIG. 4, 1st-OR gate 21 composed plural steps of OR elements, according to the number of Boolean values to input. The processing time of these plural steps of OR elements also becomes longer according to this number of steps, but usually taken several nanoseconds to tens of nanoseconds.

2nd-OR gate 22 inputs the Boolean value outputted from 1st-OR gate 21 and a feedback signal from AND gate 24, and then outputs a signal to AND gate 24.

Then 2nd-OR gate 22 will continue outputting TRUE if once inputted FALSE from 1st-OR gate 21, even if TRUE is inputted later from 1st-OR gate 21.

NOT gate 23 reverses the Boolean value outputted from the manual stopper 12a. NOT gate 23 normally outputs TRUE to AND gate 24 since the manual stopper 12a is normally outputting FALSE and then FALSE will be outputted to AND gate 24 if the manual stopper 12a operates.

AND gate 24 outputs TRUE if all the inputted Boolean values set to TRUE, and outputs FALSE if at least one of the inputted Boolean values set to FALSE. Thereby, AND gate 24 normally outputs FALSE, because normally inputs TRUE from NOT gate 23 and normally input FALSE from 2nd-OR gate 22.

Then the input signal from 2nd-OR gate 22 changes to TRUE, and AND gate 24 outputs TRUE to output the control signal for starting the pump P. Then TRUE outputted from AND gate 24 may return to 2nd-OR gate 22 as mentioned above, AND gate 24 will continue inputting TRUE from 2nd-OR gate 22.

If the manual stopper 12a goes into function, AND gate 24 inputs FALSE from the NOT gate 23 and then outputs FALSE to output control signal for stopping the pump P.

Figure 5:
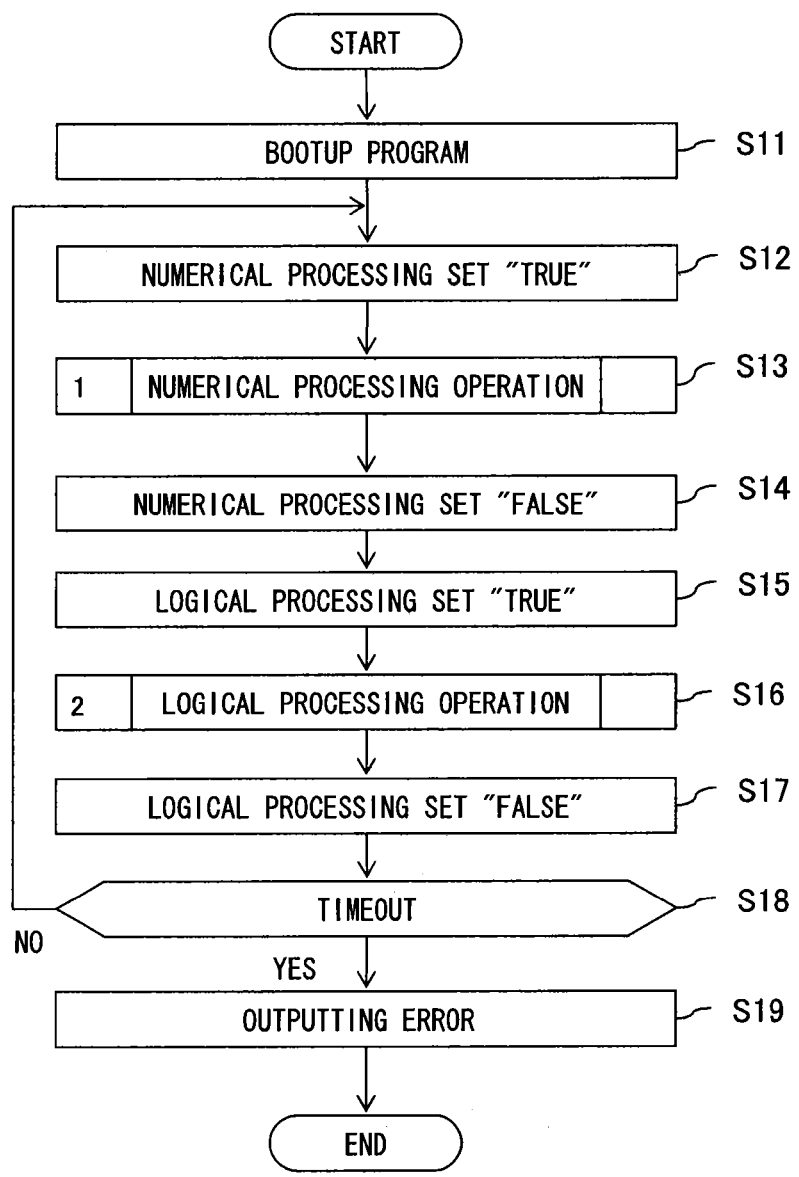
FIG. 5 is a flowchart explaining behavior of the control device in accordance with a first embodiment.

Based on FIG. 5 (suitably refer to FIG. 1) the first embodiment of the operation of the safety interlock 10 is explained.

First, when the safety interlock 10 is turned on, the program and constant (threshold value) stored in ROM will be read into RAM to boot up (S11). Then setting the bit TRUE on the input portion 13 showing the numerical processing part 11 is performing (S12), and then the numerical processing mentioned later is operated (S13).

The numerical processing (S13) is started after checking of logical processing is set to FALSE (S17).

After complete of the numerical processing in the part 11, setting the bit will exchange from TRUE to FALSE on the input portion 13 (S14). Then setting the bit TRUE on the output portion 14 showing the logical processing part 20 is performing (S15), and then the logical processing mentioned later is operated (S16).

The logical processing (S16) is started after checking of numerical processing is set as FALSE (S14).

After complete of the logical processing in the part 20, outputting the control signal concerning the safety protection operation of a plant and then setting the bit will exchange from TRUE to FALSE on the output portion 14 (S17).

When passing the time set up with the watch dog timer 15 (S18 No), setting the bit TRUE on the input portion 13 (S12), and then the numerical processing by the part 11 is operated (S13). Thereby, the loop of (S12)-(S17) is repeated with the cycle related with the setting period of the watch dog timer 15.

The reset timing of the watch dog timer 15 may be sufficient any one point of the start point (TRUE setup point) and the end point (FALSE setup point) of the numerical processing operation (S13) and the logical processing operation (S16).

On the other hand, if FALSE of logical processing is not set up within the setting period of the watch dog timer 15, it is regarded as timeout (S18 Yes) and the processing error signal will be outputted (S19).

Thus, it is hardly the processing error signal outputted because the numerical processing operation (S13) and the logic operation process (S15) are not operated simultaneously.

In case such the processing error is needless to consider, the numerical processing operation (S13) and the logical processing operation (S16) may be operated without checking FALSE setup with the logical processing (S17) and a FALSE setup with the numerical processing (S14).

Figure 6:
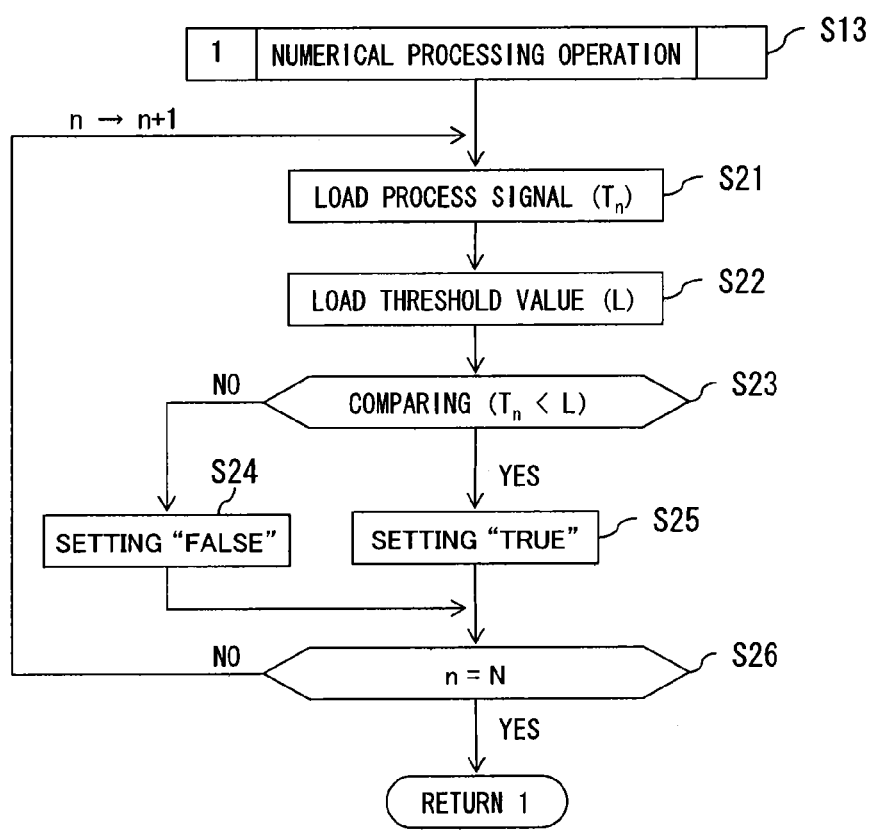
FIG. 6 is a flowchart explaining behavior of numerical processing part applied to each embodiment.

Based on FIG. 6, operation of the numerical processing part 11 is explained.

In a series of flows of operation shown in FIG. 5, when the operating in the numerical processing part 11 is started (S13), the process signal T from the plural various sensors (N pieces) is inputted into the input portion 13, and then each loaded to CPU in turn (S21). Then CPU executes the command mentioned above A1-A8, compare with the loaded process signal T and the corresponded threshold value L (S22, S23), and then the normal/abnormal judged Boolean value (FALSE/TRUE) is set to the output portion 14 (S24, S25).

The exemplified command above A1-A8 is executed in order from n=1 to N toward to N process signals $T_n$ ($T_1$-$T_N$) (S26 No), and then complete the numerical processing operation (S26 Yes). Although FIG. 6 the repeated loop exists in S26, but an actual operation program can constitute sequentially the N operation programs correspond to the N process signals T, and can also exclude the repetition processing on a program.

Based on FIG. 2A, FIG. 2B, FIG. 3A, and FIG. 3B explain the operation of the logical processing part 20 (operational flow of S16 in the whole flow of FIG. 5).

First, as shown in FIG. 2A, all the Boolean values of each means 12a, 12b, 11a, and 11b stored in the output portion 14 are FALSE under the normal operating state there is no abnormalities in the plant. Then the logical processing part 20 output FALSE to output the control signal for stopping the pump P.

Figure 2B:
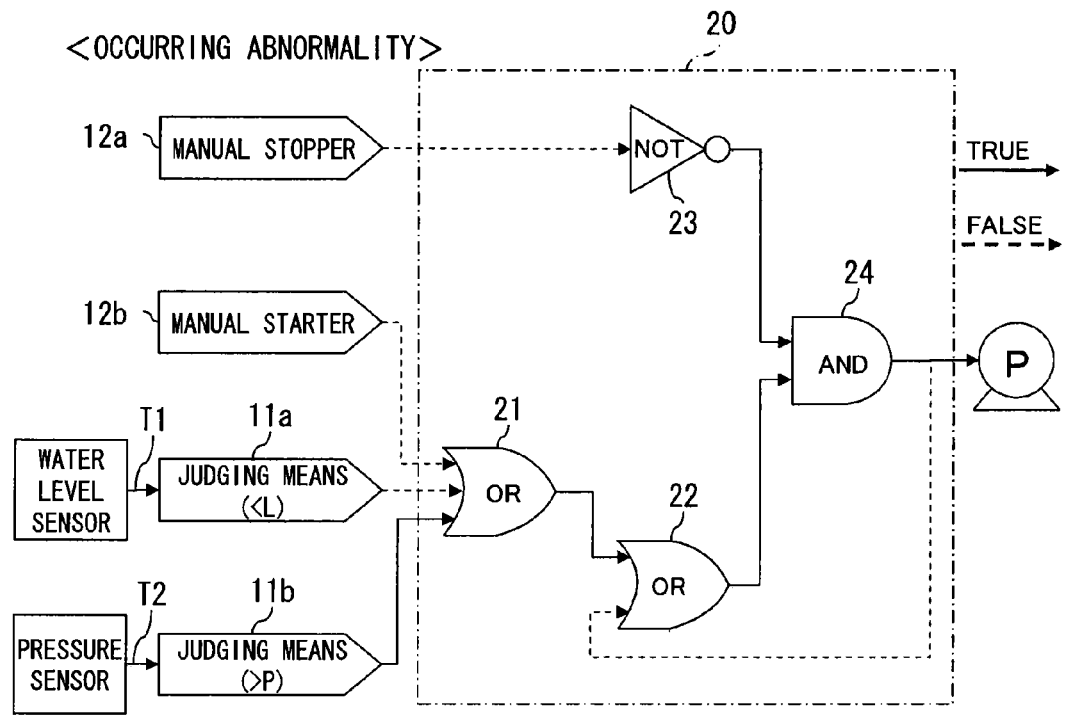
FIG. 2B is an explanatory view of the composition and operation for a logical processing part applied to each embodiment.

As shown in FIG. 2B, suppose that abnormalities occurred in the plant, the plant signal T2 of the pressure sensor is judged abnormal, and the judging means 11b set Boolean value to TRUE, for example. Then, 1st-OR gate 21 inputs TRUE to output TRUE, and 2nd-OR gate 22 inputs TRUE to output TRUE as well.

Since NOT gate 23 normally output TRUE, if TRUE is outputted from 2nd-OR gate 22, AND gate 24 inputs these two TRUE and output TRUE to output the control signal for starting the pump P.

Figure 3A:
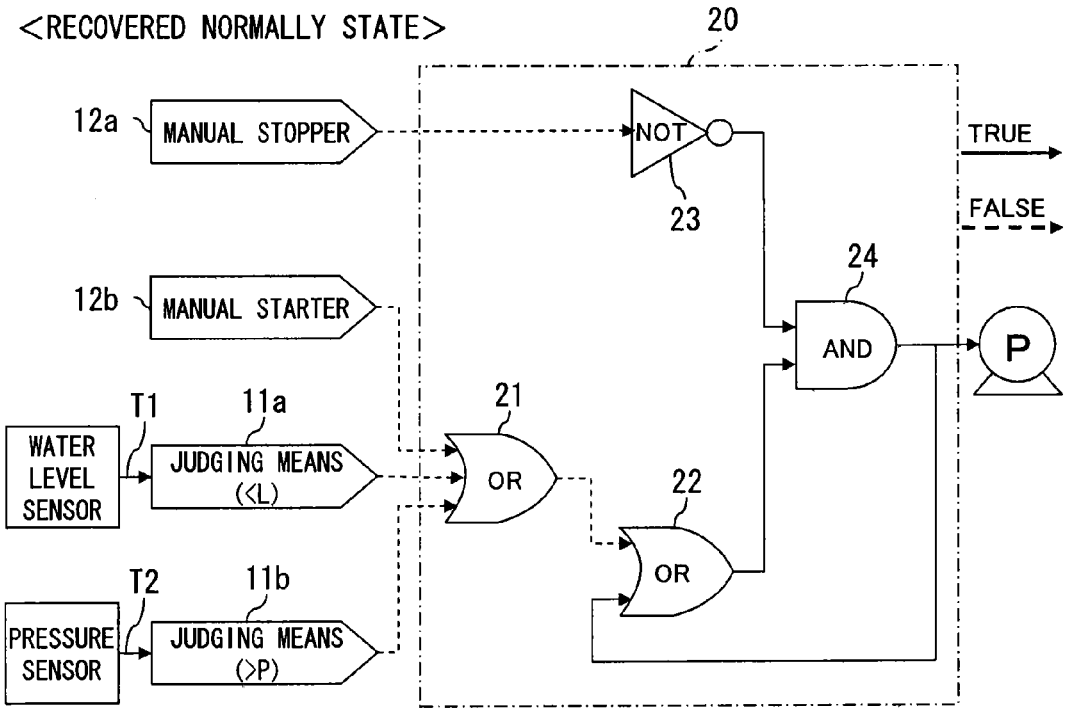
FIG. 3A is an explanatory view of the composition and behavior of a logical processing part applied to each embodiment.

FIG. 3A shows the states that the plant signal T2 of the pressure sensor is recovered normally and the judging means 11b came to output FALSE.

However, TRUE currently outputted from AND gate 24 returned to the input side of 2nd-OR gate 22, AND gate 24 continues outputting TRUE to output the control signal for starting the pump P.

Figure 3B:
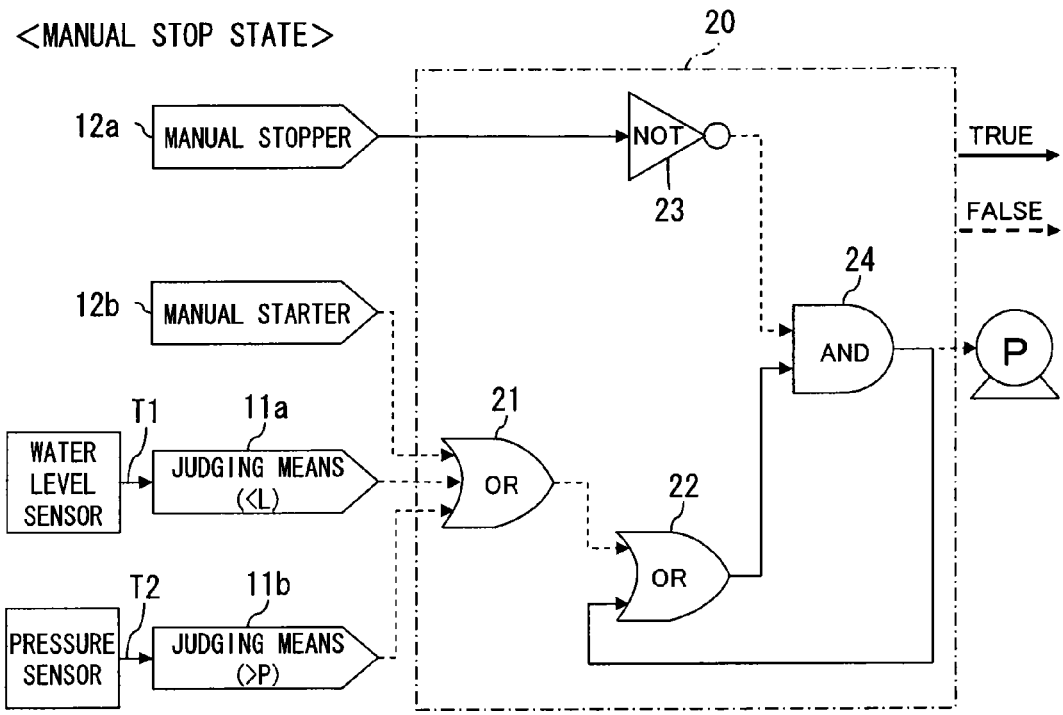
FIG. 3B is an explanatory view of the composition and behavior of a logical processing part applied to each embodiment.

FIG. 3B shows the condition that the manual stopper 12a outputs TRUE to stop the pump P by manual operation of the plant operator.

Accordingly the Boolean value outputted from the NOT gate 23 will change to FALSE, and AND gate 24 will output FALSE to output the control signal for stopping the pump P.

In this embodiment mentioned above, the numerical processing part 11 which operates the numerical process efficiently, and the logical processing part 20 which operates the logical process efficiently are combined. Therefore the whole operation is performed efficiently, compared with the case where the logical operation is made also with CPU alone or where the numerical operation is incorporated also in FPGA As a result, the safety interlock 10 is configured with cheap parts and the reliability thereof is improved because there is no necessity of using high performance CPU with high fever. Besides simplifying CPU processing and simplifying the composition of the software including the diagnostic function.

(The Second Embodiment)

Figure 7A:
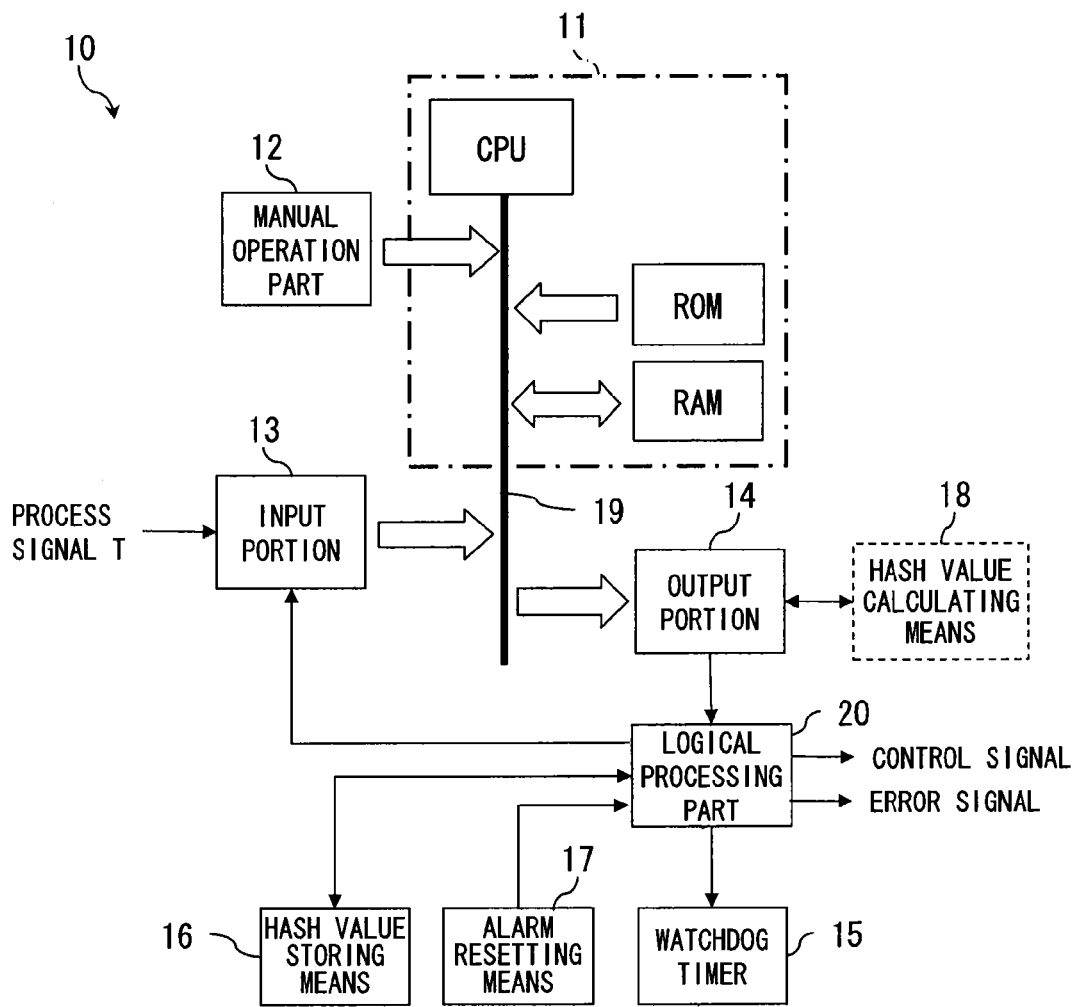
FIG. 7A is a block diagram showing a control device in accordance with a second embodiment of the present invention.

FIG. 7(A) shows the block diagram of the safety interlock 10 according to a second embodiment. Here, among the components described in FIG. 7(A), same reference numerals will be given to components common to those described in FIG. 1, and description thereof will be omitted by citation of the above-mentioned description.

The safety interlock 10 according to this second embodiment further having some functions contrasted with the first embodiment; a function for calculating the hash value of the program and the constant at the numerical processing part 11; a function for the output portion 14 outputting the calculated hash value with the Boolean value to the logical processing part 20; a storing means 16 for storing the outputted hash value; a function for the logical processing part 20 evaluating the identity of the stored hash value and the next outputted hash value and sending an error signal together with an alarm in case inharmonious; and means 17 for alarm resetting to stop the alarm manually.

The hash value storing means 16 is realized as external RAM of the logical processing part 20, and also be realized as an internal circuit of the logical processing part 20. The alarm resetting means 17 is realized also as a push button provided in the manual operation part 12 for example.

A hash value calculation program calculates the hash value of the program and the constant resided in RAM, and sets the result to the output portion 14. These program and constant will not change after initialization of the safety interlock 10 and start processing of the execution mode.

Therefore, exchanging the hash value means a memory error, a program error, or an intentional change with malicious, and the abnormal condition occurred anyway.

As a calculation method of a hash value, SHA (hash function which U.S. National Institute of Standards and Technology published), and MD5 (hash function released to IETF RFC1321) can be used. Otherwise a cyclic redundancy code (CRC) inspection etc. can be used. In a viewpoint of cyber security, it is desirable a cryptography hash function such as SHA or MD5.

Logic processing part 20 reads a new hash value from the output portion 14 for every cycle of starting logical processing to compare with a last hash value recorded on the storing means 16, and replaces the last hash value by the new hash value. Then alarm is generated if the result of comparison of the hash value is not in agreement.

At the time of starting of the safety interlock 10, the alarm is generated because the last hash value in the storing means 16 and the new hash value calculated in the numerical processing part 11 are not in agreement.

The plant operator resets the alarm by the resetting means 17 at the time of starting of the safety interlock 10. Thereby, the plant operator can be checked about whether the hash value comparison function operates normally.

When the alarm generated during the execution mode, the operator can recognize that the program or the constant memorized in RAM is changed. The means for setting or resetting the alarm is easily realized by the flip-flop.

Figure 7B:
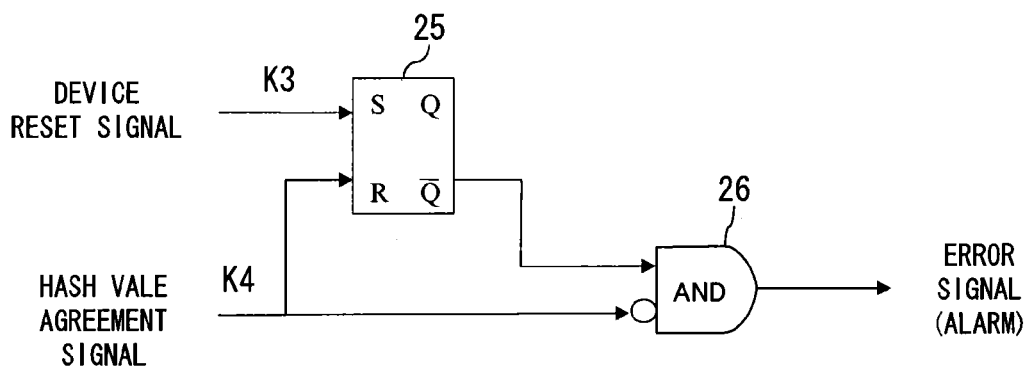
FIG. 7B is a diagram for an alarm resetting circuit.

FIG. 7B shows the reset circuit diagram of the alarm which can also prevent first-time alarm generating.

The reset circuit diagram includes; the flip-flop 25 to be reset when the new hash value read from the output portion 14 corresponds with the last hash value recorded on the storing means 16; and AND gate 26 executing AND calculation of the reversal output of the flip-flop 25 with the reversal of the hash value corresponding signal. The first-time alarm does not generate because the reversal output of flip-flop 25 is not set to TRUE unless the hash value corresponds at least once.

Figure 8:
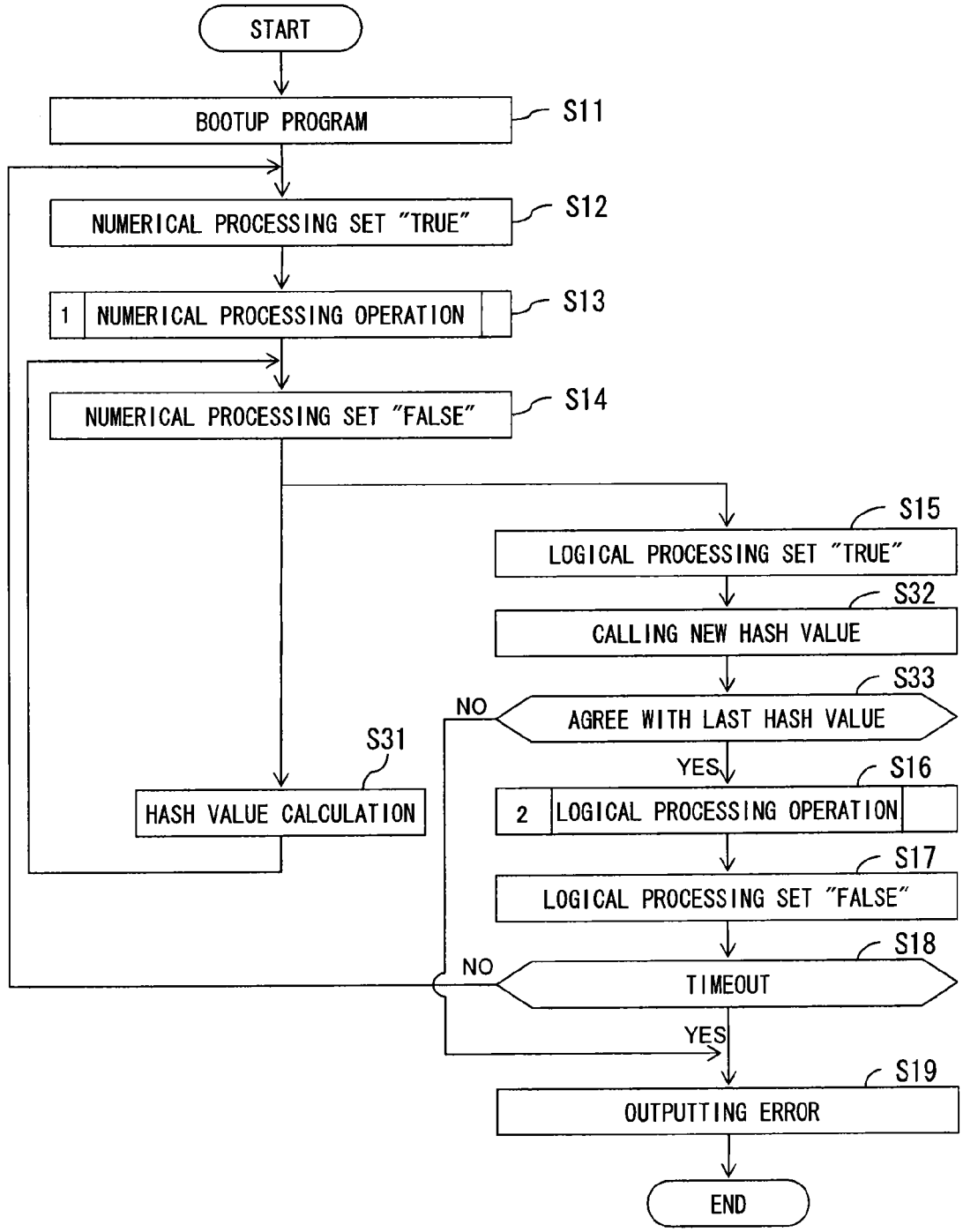
FIG. 8 is a flowchart explaining behavior of a control device in accordance with a second embodiment.

Based on FIG. 8 the second embodiment of the operation of the safety interlock of the plant is explained.

Here the flow (S11) to (S19) of FIG. 8 in the second embodiment is the same as the flow (S11) to (S19) of FIG. 5 in the first embodiment, the explanation thereof is omitted.

According to a second embodiment, calculation of the hash value of the program and the constant are performed in parallel (S31) with the logic operation process (S16). Then the calculated hash value is stored in the output portion 14 together with the numerical processing operation result carried out in the next cycle.

If TRUE declared starting logical processing is set to the output portion 14, the new hash value is called (S32), and compare with the last hash value, and will be overwritten save at the storing means 16.

If the new hash value agree with the last hash value (S33 Yes), it is judged with having no abnormalities, and then the operation flow (S16)-(S18 No) is repeated.

On the other hand, if the new hash value do not agree with the last hash value (S33 No), it is judged with occurring abnormalities, and then error is outputted (S19).

As a modification, calculation of the hash value (S31) may not be performed in parallel with the logic operation process (S16), but may be performed in series before or after of the numerical processing operation (S13).

The calculation of the hash value (S31) may also be performed by hash value calculating means 18, as shown in FIG. 7A, provided for exclusive use besides performed by CPU.

The program and the constant resided in RAM may be contrasted the same stored in ROM directly, without performing calculation of the hash value (S31).

According to the second embodiment, it is possible to detect an error occurred in the program and the constant which are indispensable to CPU processing. Moreover malicious change is certainly detectable.

(The Third Embodiment)

Figure 9A:
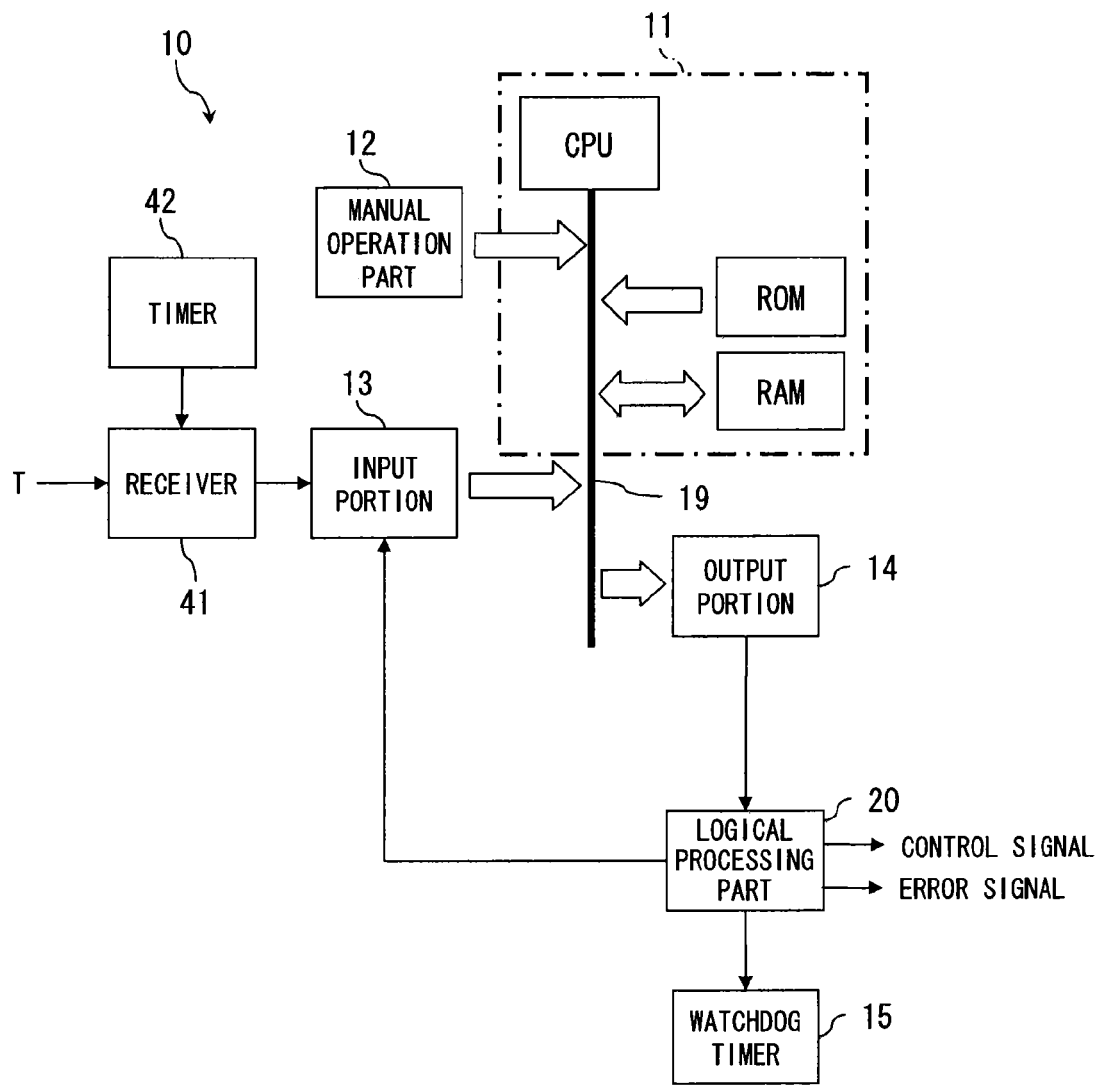
FIG. 9A is a block diagram showing a control device in accordance with a third embodiment of the present invention.
Figure 9B:
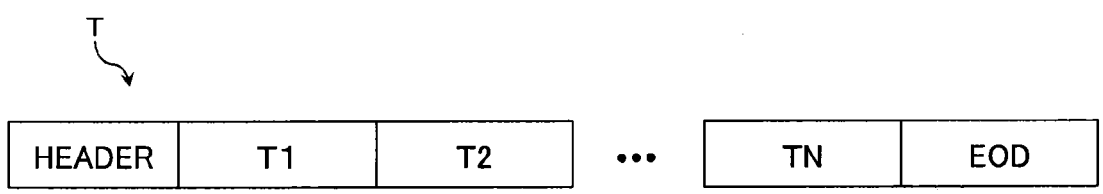
FIG. 9B is an explanatory view of a packet structure of a plant signal.

FIG. 9A shows the block diagram of the safety interlock 10 according to the third embodiment. FIG. 9B shows the packet structure of the plant signal T. Here, among the components described in FIG. 9A, same reference numerals will be given to components common to those described in FIG. 1, and description thereof will be omitted by citation of the above-mentioned description.

In the third embodiment, the various process signals T ($T_1$-$T_N$) are multiplexed with a cyclic code; and further comprising: a receiver 41 for receiving the multiplexed process signal T and then checking an error from the cyclic code; and a timer 42 for holding the checked process signal in the input portion 13 for a predetermined time interval.

The receiver 41 is realizable by the hardware which used FPGA or ASIC.

The receiver 41 receives the process signal T of the packet multiplexed at the remote I/O station (not shown). The packet form as shown in FIG. 9B, at the header of the packet contains the cyclic code for detecting the error of the signal.

Behind the header, various process signals T1-TN are stored as 16 bits data each, and EOD code is formed in the termination.

The receiver 41 saves the various process signal $T_1$-$T_N$ at the same number of register provided inside. Then the receiver 41 calculates the cyclic code from the signal saved at the register, compared with the cyclic code contained in the header, and then notifies an error if not in agreement.

The timer 42 sends a signal to receiver 41 every 25 ms, if the error is not detected in comparison with a cyclic code, the various process signals $T_1$-$T_N$ saved at the register of the receiver 41 will be written in the input portion 13 in order after the address set beforehand.

Then the various process signal $T_1$-$T_N$ written in the input portion 13 will be performed the numerical processing in the part 11, after that will be performed the logical processing in the part 20.

According to the third embodiment, also in the safety interlock composed using a remote I/O station for cable reduction, CPU can concentrate on numerical processing operation without applying a new load. Even when abnormalities are occurred in the remote I/O station, the influence can be made into the minimum.

(The Fourth Embodiment)

Figure 10:
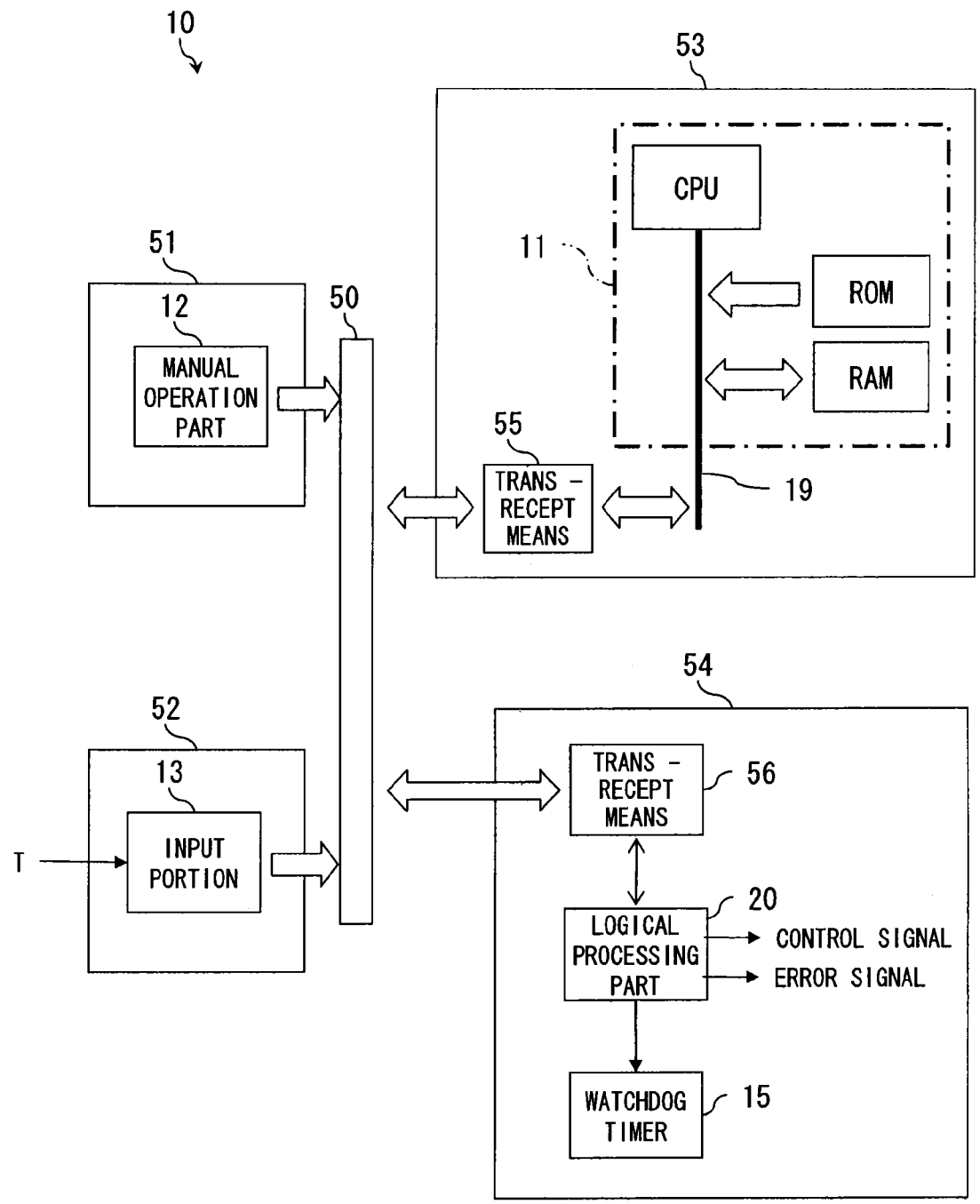
FIG. 10 is a block diagram showing a control device in accordance with a fourth embodiment of the present invention.

FIG. 10 shows the block diagram of safety interlock 10 according to the fourth embodiment. Here, among the components described in FIG. 10, same reference numerals will be given to components common to those described in FIG. 1, and description thereof will be omitted by citation of the above-mentioned description.

Back plane 50 has plural connectors (not shown) in which plural extended boards 51, 52, 53, and 54 are inserted, respectively, and these connectors are formed on the bus data exchangeable mutually.

The manual operation part 12 is mounted on the first extended board 51. The input portion 13 and the controller (not shown) for transmitting data to back plane 50 are mounted on the second extension board 52. The numerical processing part 11 and the first transmission-reception means 55 are mounted on the third extension board 53. The second transmission-reception means 56, the logical processing part 20, and the watch dog timer 15 are mounted on the fourth extension board 54.

The input portion 13 transmits the inputted process signal T to the first transmission-reception means 55 on the third extension board 53 via the bus of the back plane 50. Then the transmitted process signal T is recorded on the address in RAM defined beforehand, the decision of normal/abnormal is made in the numerical processing part 11, and the Boolean value corresponding to the decision result is outputted.

The first transmission-reception means 55 and the second transmission-reception means 56 exchange data to the parts mounted on other extended boards mutually via the bus on the back plane 50.

The Boolean value outputted from the numerical processing part 11 is transmitted to the second transmission-reception means 56 on the fourth extension board 54 via the first transmission-reception means 55 and the bus on the back plane 50.

The Boolean value transmitted to the fourth extension board 54 is operated in the logical processing part 20, and outputs the control signal concerning the safety protection operation of a plant.

The second transmission-reception means 56 transmits the end signal to the numerical processing part 11 via the first transmission-reception means 55 and the bus on the back plane 50. The end signal indicates that the processing in the logical processing part 20 was completed.

The end signal is recorded on the determined address on RAM, and is used as conditions of the numerical processing in the part 11. Further not only the end signal but also the processing result of the logical processing part 20 can be used as conditions of the numerical processing by feed back to the numerical processing part 11 via the transmission-reception means 55, 56.

REFERENCE SIGNS LIST

10 safety interlock (control device)
11 numerical processing part
11*a*, 11*b* judging means
12 manual operation part
12*a* manual stopper
12*b* manual starter
13 input portion
14 output portion
15 watch dog timer
16 hash value storing means
17 alarm resetting means
20 logical processing part
21 1st-OR gate
22 2nd-OR gate
23 NOT gate
24 AND gate
25 flip-flop
41 receiver
42 timer
50 back plane
51, 52, 53, 54 extended board
55 first transmission-reception means
56 second transmission-reception means
T ($T_1$-$T_N$) process signal

The invention claimed is:

1. A control device comprising:
an input portion for inputting process signals transmitted from a plant;
a numerical processing part that evaluates, by numerical processing performed on a CPU based on a program, a normal or an abnormal state for each inputted process signal, and outputs a respective Boolean value for each inputted process signal, wherein the respective Boolean value is indicative of the normal or abnormal state of the respective inputted process signal;
a logical processing part that processes, on a logic circuit, the respective Boolean values, and then outputs a control signal related to a safety protection operation of the plant, wherein the logic circuit includes logic elements realized by hardware logic gates, wherein
the logical processing part comprises:
a 1st-OR gate, an AND gate, and a 2nd-OR gate, wherein
the 1st-OR gate receives the respective Boolean values for each inputted process signal and a Boolean value originated in a manual starter of the safety protection operation;
the AND gate receives a Boolean value originated in a manual stopper of the safety protection operation and the Boolean value outputted from the 2nd-OR gate, and then outputs the control signal related to a safety protection operation of the plant; and
the 2nd-OR gate receives a Boolean value outputted from the 1st- OR gate and the control signal outputted from the AND gate, and then outputs a Boolean value to the AND gate.

2. The control device according to claim 1, wherein the numerical processing part performs the numerical processing sequentially for the inputted process signals, and then finally outputs an operation complete signal.

3. The control device according to claim 1, further comprising:
a watch dog timer for reporting a timeout information a period to end from a start of the logical processing part or a period to end of the logical processing part from a start of the numerical processing part exceeds a setting time.

4. The control device according to claim 1, wherein the numerical processing part calculates a hash value of the program and a constant, and then outputs the hash value with the respective Boolean values;
the logical processing part evaluates the identity of a new hash value inputted at a first time and a last hash value inputted at a time prior to the first time.

5. The control device according to claim 1, wherein the inputted process signals are multiplexed with a cyclic code; and further comprising:
a receiver for receiving the multiplexed process signals and then checking an error from the cyclic code; and a timer for holding the checked inputted process signals in the input portion for a predetermined time interval.

6. The control device according to claim 1, wherein
the input portion, the numerical processing part, and the logical processing part are mounted in separate extended boards respectively;
each extended board is connected with a bus via a connector.

* * * * *